United States Patent [19]

Lapatovich

[11] Patent Number: 5,191,460
[45] Date of Patent: Mar. 2, 1993

[54] UV SOURCE FOR HIGH DATA RATE SECURE COMMUNICATION

[75] Inventor: Walter P. Lapatovich, Marlborough, Mass.

[73] Assignee: GTE Laboratories Incorporated, Waltham, Mass.

[21] Appl. No.: 629,886

[22] Filed: Dec. 19, 1990

Related U.S. Application Data

[63] Continuation-in-part of Ser. No. 498,258, Mar. 23, 1990, abandoned.

[51] Int. Cl.$^5$ ............................................ H04B 10/00
[52] U.S. Cl. .................................... 359/154; 359/180; 313/643; 250/504 R
[58] Field of Search ................ 313/643, 637; 455/618; 250/504 H, 504 R, 372; 359/154, 180, 184

[56] References Cited

U.S. PATENT DOCUMENTS

| | | | |
|---|---|---|---|
| 2,562,887 | 8/1951 | Beese | 455/618 |
| 3,189,744 | 6/1965 | Ogland | 455/618 |
| 3,383,460 | 5/1968 | Pritchard | 455/618 |
| 3,453,427 | 7/1969 | Leiga et al. | 250/42 |
| 4,156,826 | 5/1979 | Hernqvist | 313/636 |
| 4,266,167 | 5/1981 | Proud et al. | 315/248 |
| 4,427,921 | 1/1984 | Proud et al. | 313/637 |
| 4,493,114 | 1/1985 | Geller et al. | 359/184 |
| 4,497,068 | 1/1985 | Fischer | 455/618 |
| 4,874,984 | 10/1989 | Sigai et al. | 313/486 |

OTHER PUBLICATIONS

Ury, Israel, Optical Communications Microwave Journal, Apr. 1985, pp. 24-35.
Lerner, R. M., Holland, A. F., The Optical Scatter Channel, Proceeding of the IEEE vol. 58, No. 10, Oct. 1970, pp. 1547-1563.
Benck, E. C., Lawler, E., Daki-, J. T., Lifetimes, Branching Ratios, and Absolute Transition Probabilities in Hg I, J. of the Optical Soc. of America, vol. 6, Jan. 1989, pp. 11-22.
Lapatovich, W. P., Final Report, Contract No. N66001-86-C-0398 "Performance Tests in Conjunction with (Cains) Program", Jan. 1987.
Kennedy, R. S., Communication Through Optical Scattering Channels: An Introduction, Proc. of the IEEE, vol. 58, No. 10, Oct. 1970, pp. 1651-1665.
Huennekens, J., Park, H. J., Colbert, T., McClain, S. C., Radiation Trapping in Sodium-Noble-Gas Mixtures, Amer. Phys. Soc., vol. 34, vol. 7, (Apr. 1987) pp. 2892-2901.
Van de Weijer, P., Cremers, R. M. M., Determination of the Effective Radiative Lifetime of the 6 $P^3_1$ Atomic Mercury Level in Low-Pressure Mercury Discharges, J. Appl. Phys. 57(3) Feb. 1985, pp. 672-677.
Optic Grade 4, Melles Griot, Irving, Calif. (1988) pp. 3-4, 3-5.
Fused Quartz Products, GE Cleveland, Ohio GE General Catalog 7705-7725 p. 20 (1983).
Linear and Interface Integrated Circuits, Motorola Inc., pp. 3-453 to 3-462 (1987).

*Primary Examiner*—Edward L. Coles, Sr.
*Assistant Examiner*—Kinfe-Michael Negash
*Attorney, Agent, or Firm*—Carl F. Ruoff; Victor F. Lohmann, III

[57] ABSTRACT

A method and apparatus for high speed transmission of data in the solar blind region is disclosed. An ultraviolet source is modulated to permit digital transmission of data. The source includes an electrodeless capsule of UV transmitting material filled with iodine vapor. A means of energizing the iodine vapor into a plasma state is provided by a magnetron, power triode or solid state supply. A circuit to modulated the energizing means is used to impress upon the plasma discharge the encoded data. Filtering means surround the capsule to filter out the plasma background noise. The advantages of the UV communications method and apparatus described are increased pulse rate, faithful conversion of electrically pulsed data into optical pulses with decreased error rate, decreased probability of interception and non-line of sight communication.

8 Claims, 6 Drawing Sheets

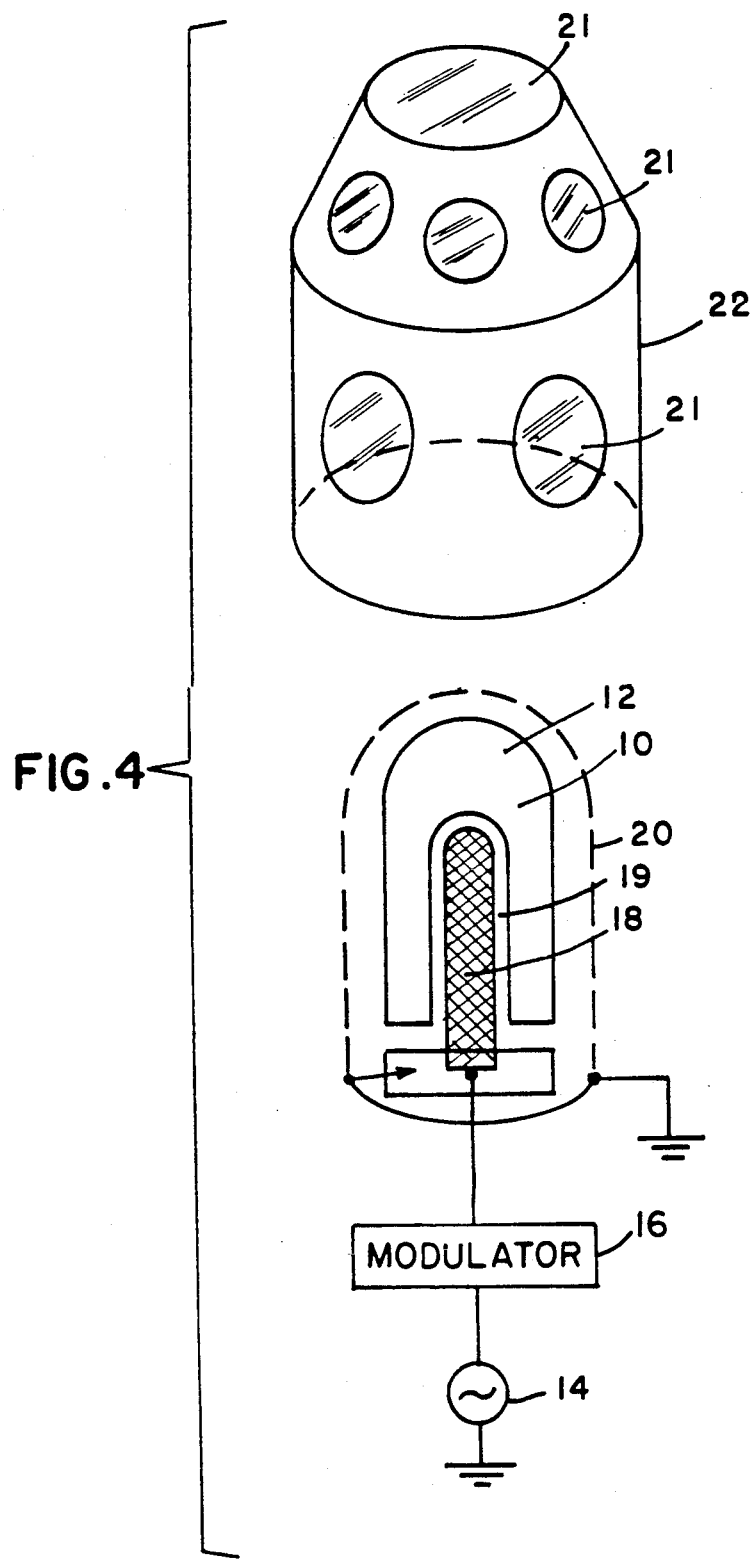

UV SOURCE FOR HIGH DATA RATE SECURE COMMUNICATION

CROSS-REFERENCE TO RELATED APPLICATION

This application is a continuation-in-part of applicant's copending application, Ser. No. 07/498,258 Mar. 23, 1990 (now abandoned) which application is copending.

BACKGROUND OF THE INVENTION

This invention relates to communications devices. In particular, this invention relates to secure communications systems of limited range with low probability of intercept. The disclosure teaches specifically about a novel UV source in the solar blind region of the spectrum which can be used to transmit data at high data rates, e.g. greater than 100 kHz. Short range, compactness, ruggedness, non-line of sight (NLOS), and reduced ambient noise levels are all features of the instant invention.

Solar blind communications systems for covert and NLOS communication have been of interest for several years. Operation in the solar blind spectral region (200 to 300 nm) makes the system immune from natural optical noise (e.g. sunlight). The NLOS and limited range of these systems are the result of signal propagation through the atmosphere via optical scattering. The particularly short range of the instant invention results from increased atmospheric scattering at shorter wavelengths. The applications of such systems range from local battlefield communications, to downloading inertial navigational data to aircraft, to communication among various segments of aircraft or naval vessels.

Most UV based communications (UVCOM) systems to date have relied on the 254 nm emission from atomic mercury. This emission is the basis of all conventional fluorescent lamps. However, fluorescent lamps have phosphor coating on the inner surface of the lamp envelop. Lamps used in the present UVCOM systems are commercially available germicidal lamps. These are mercury rare gas discharges without the phosphor and with a UV transmissive envelope. While these lamps perform well for generating continuous (or 60 Hz) UV, they have certain drawbacks for generating pulsed UV necessary for digital data transmission.

The maximum useful modulation rate using mercury is about 50 kHz. This limitation arises because of the self trapping of the resonance radiation regardless of the method of excitation, i.e. electroded or electrodeless. The present invention presents a system which allows higher modulation rates and thereby increases digital data transmission rates.

SUMMARY OF THE INVENTION

The present invention discloses a UV communications system which operates in the solar blind region. The system comprises a UV transmissive envelope having a reentrant cavity and containing iodine vapor which forms during discharge a plasma which emits ultraviolet radiation. An inner conductor is positioned in the reentrant cavity while an outer conductor is positioned about the outer surface of the UV transmissive envelope. The relationship of the inner to the outer conductor dimensions largely determines the impedance of the transmitter. In the case of a weakly ionized, low density plasma as taught herein, the impedance is approximately $Z \simeq (138/\sqrt{\epsilon})\log_{10}(D/d)$, where D is the diameter of the outer conductor, d is the diameter of the inner conductor and $\epsilon$ is the dielectric constant of the plasma which is approximately 1 for low density and low levels of ionization. Consequently, by suitable choice of dimensions one can match the optical transmitter impedance to the power source impedance to effect maximum energy transfer into the plasma. A high frequency power source is coupled to the inner and outer conductors for inducing an electric field within the envelope and causing a discharge. A modulation circuit is coupled to the high frequency power source which modulates the power source in response to the data signal to be transmitted. Filtering means surround the envelope to filter the desired wavelength from the background plasma noise.

OBJECTS OF THE INVENTION

An object of the present invention is to provide a short-range communications system which is difficult for a third party to intercept.

Another object of the present invention is to provide a UV source which can be used to transmit data digitally at high speed for non-line of sight applications.

Yet another object of the present invention is to provide a solar blind UV source for data transmission which has a reduced background noise level.

BRIEF DESCRIPTION OF THE DRAWING

FIG. 4 shows one embodiment of an apparatus useful for carrying out data transmission.

DESCRIPTION OF PREFERRED EMBODIMENTS

Figure 1:
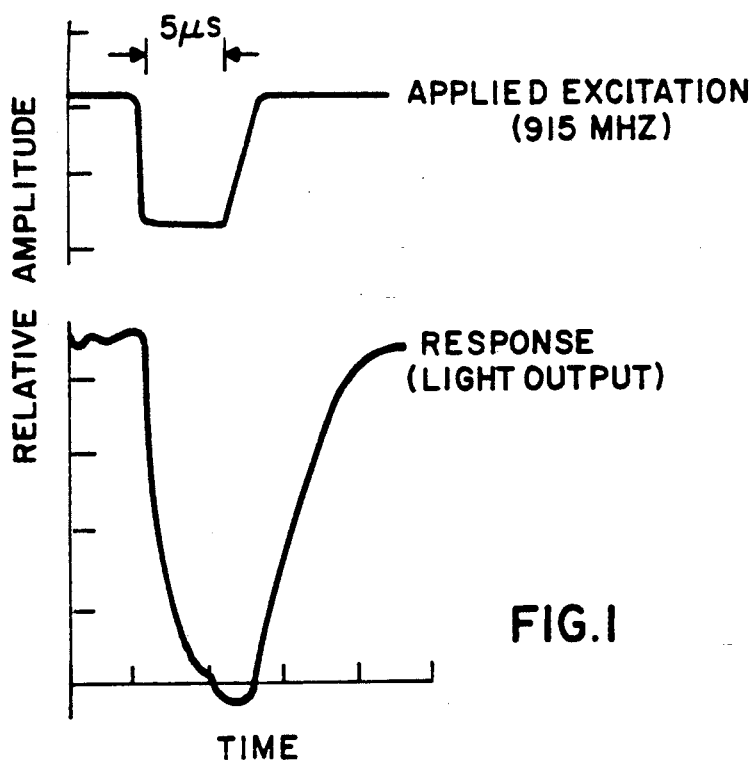
FIG. 1 shows the solar blind UV output and RF excitation pulse of a pulsed RF discharge containing mercury.

Shown in FIG. 1 is the UV output of a pulsed electrodeless RF discharge containing mercury (Hg). The applied RF excitation is at 915 MHz and 5 microseconds ($\mu$s) in duration. The observed UV output is represented by the lower curve. The output rises to a peak level which corresponds to the end of the applied excitation pulse. The output remains at this level and then slowly decays when the RF excitation is terminated. It is this long decay time which limits the rate at which error free data can be sent using pulsed mercury discharges as the tail of one pulse runs into the beginning of a following pulse. This effect, graphically shown in FIG. 1, causes an increased bit error rate for data transmission rates exceeding approximately 50 kHz. This effect worsens with rising temperature and with increasing mercury density.

Figure 2:
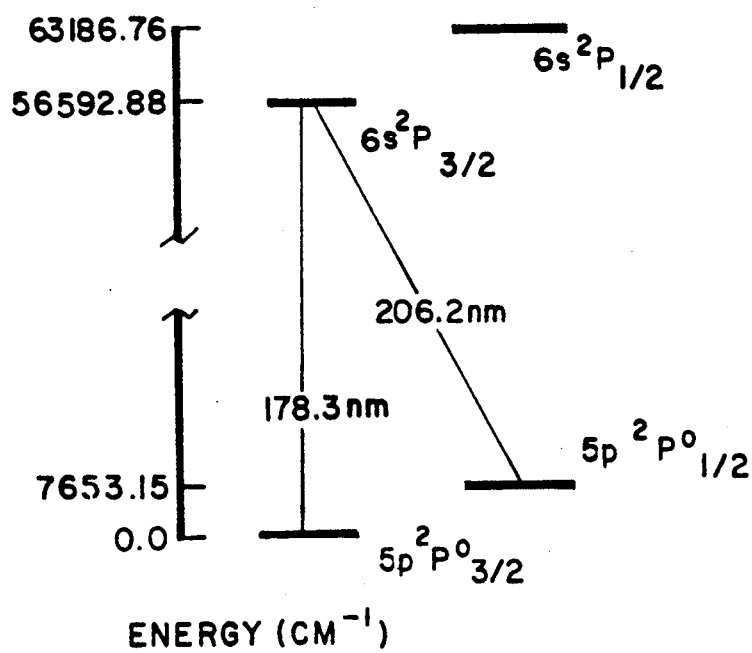
FIG. 2 shows relevant atomic iodine electron energy levels.

Using iodine as the fill material rather than mercury gives rise to useful UV emission within the solar blind region, specifically the transition giving rise to 206.2 nm emission. FIG. 2 shows the relevant atomic iodine energy levels. The terminating level of this state is not the ground state of this atom, but a fine structure component thereof.

The ground state of an atom is its lowest accessible energy level. It is in this state that most atoms reside at normal temperatures, and accordingly are available to reabsorb light (as in Hg). In the iodine atom, the ground state is split by the fine structure Hamiltonian (i.e. the interaction of angular momenta in the atom) into two components. The lowest level, $^2P°_{3/2}$, is the "ground state". The other component, $^2P°_{\frac{1}{2}}$, lies approximately 0.9 eV above the ground state, and at room temperature has only $e^{-0.9/(1/40)}$ or approximately $2 \times 10^{-16}$ as many atoms as occupy the ground state ($n_{2p°\frac{1}{2}} = n_{2p°_{3/2}} e^{-\epsilon/kT}$). Consequently the reabsorption from this level is small. This level becomes populated when 206 nm photons are emitted, however, this population can be removed by collisional quenching very rapidly. The net effect is to raise the above fraction to approximately $2 \times 10^{-10}$ which is still very small. Thus, population of the atoms in this level is limited and self absorption is minimized.

Figure 3A:
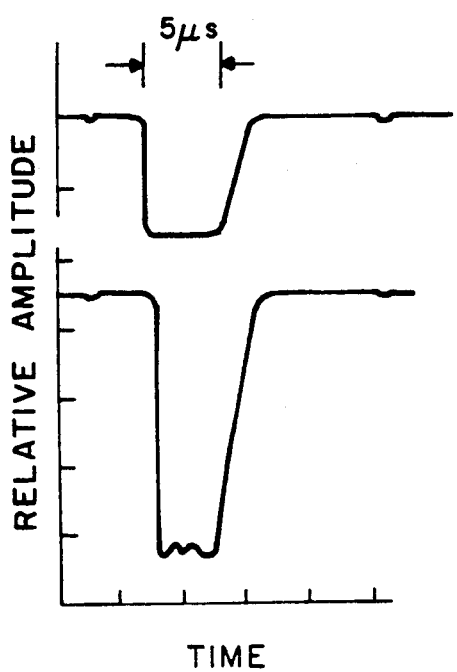
FIG. 3 (a) and (b) shows a comparison of an iodine discharge and a mercury discharge with equivalent RF pulses.
Figure 3B:
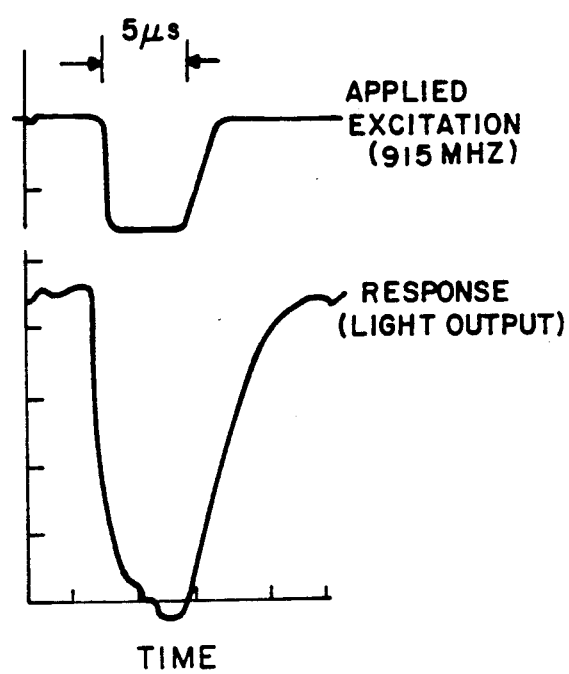

FIG. 3 compares a $5\mu s$ pulse from an RF source and the plasma response in terms of emitted UV. FIG. 3(a) shows the plasma response of a capsule containing only iodine crystals and iodine vapor. FIG. 3(b) shows the plasma response of a similar capsule containing mercury and neon vapor. Both capsules were at the same temperature (21° C.) and were operated at similar power of approximately 5W. From a comparison of FIG. 3(a) and (b) the iodine discharge UV emission more accurately reproduces the RF signal than the mercury discharge UV emission which distorts the RF signal due to intense reabsorption. The effect of reabsorption worsens with increasing temperature as the density of the mercury vapor increases. By exploiting the improved reproduction of electrical impulse to UV signal using iodine an improved short range UV communications system is produced.

The present invention describes a solar blind UV emitting source which can be used for UV communications (UVCOM). The UV source is not limited by the self trapping or long decay times as are mercury UV emitters. By minimizing the self trapping, the UV source of the present invention can respond more rapidly to electronic signals and consequently the data transmission rate can be increased while reducing the bit error rate (BERR). Another advantage of the present invention is that the UV source transmits at a shorter wavelength (206 nm) than mercury UV emitters (254 nm), thus limiting the transmission range and thereby limiting the probability of detection while increasing security of the communication.

The instant invention consists of a UV source which can be modulated to permit encoded data to be transmitted on an optical carrier at 206 nm and is shown in FIG. 4. The UV source consists of an electrodeless capsule 10 of UV transmissive material such as suprasil. Other UV transmissive materials include regular or water-free vitreous silica, i.e quartz. The fill 12 inside the capsule 10 consists of iodine crystals and iodine vapor along with an inert gas at a low pressure ($\approx 0.1$-50 torr). The inert gas can be argon, neon, krypton, xenon or nitrogen or combinations thereof. An iodine bearing material such as mercuric iodide of sufficient vapor pressure can be used in place of the iodine crystals. Other possible fill materials include silicon tetraiodide and aluminum triiodide. A means of energizing the fill gas into a plasma state is provided by an RF source 14, which can be a power triode, a magnetron (915 MHz is convenient) or a solid state supply. A suitable energizing means is taught by Proud et al. U.S. Pat. No. 4,266,167 and is incorporated by reference herein. A circuit 16 is used to modulate the power output of the RF source and so impress upon the discharge the encoded data.

One circuit 16 used in the present invention is a square wave generator modulating a power triode. More sophisticated circuits are possible which could be designed to encode words into data strings. Such sophisticated circuitry is not part of the present invention which deals with increased data transmission rate via the faster response and more faithful conversion of electrical pulses into optical pulses of the iodine UV emitter. Encoding circuits and analog to digital signal converters are not covered here although they may be used in the present invention. A pulse generator is used during the present invention to demonstrate the underlying principal.

Figure 5:
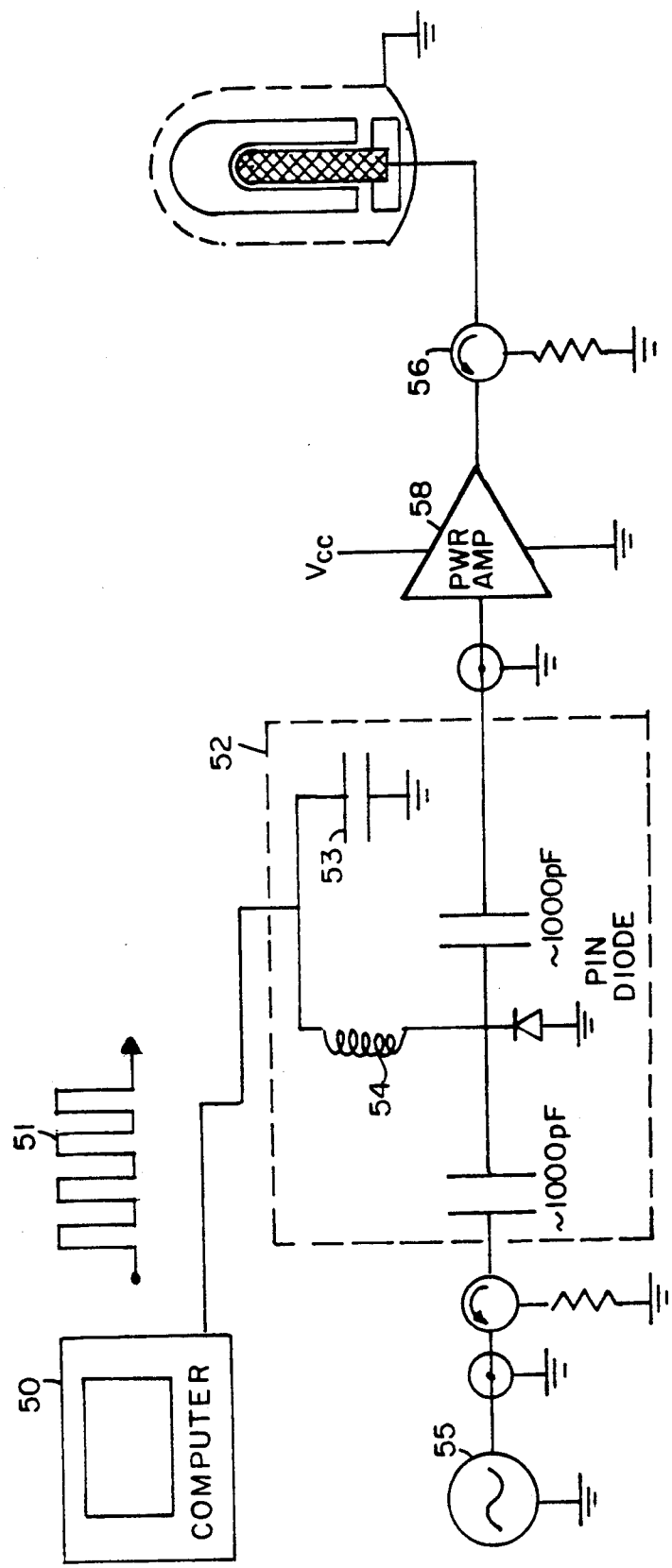
FIG. 5 shows a modulation circuit useful for carrying out data transmission.

A more detailed diagram of the present invention is shown in FIG. 5 wherein a computer 50 provides an output signal 51 which consists of Transistor-transistor logic (TTL) pulses. The pulses represent the data which is to be converted into the UV pulses. The output signal 51 modulates the low level microwave or RF signal produced by source 55 through the modulation circuit 52. The modulation circuit includes a microwave blocking network comprised of a capacitor 53, and an inductor 54, which prevent RF from returning along the TTL signal path. Two capacitors and a PIN diode form a DC blocking, high frequency reflective switch. This modulation circuit 52 converts the microwave or RF signal to correspond to the output signal 51. This modulated microwave or RF signal is then boosted to the appropriate level by power amplifier 58. The signal is sent through a circulator 56 and then to the UV lamp where UV pulses are produced which correspond to the output signal 51.

The electrodeless capsule 10 shown in FIG. 4 includes a reentrant cavity 19 which contains the center electrode 18. Outer conductor 20, which is an optically transparent conductor such as a metal mesh, substantially surrounds the outer surface of capsule 10. When high frequency power is applied to center electrode 18, an electric field running radially between outer conductor 20 and center electrode 18 cause the fill gas 12 to undergo electrical breakdown and a plasma discharge occurs within the capsule 10. Using the fill material described above, the discharge is a source of ultraviolet light at 206 nanometers.

A means of filtering the desired wavelength from the plasma noise, i.e. other radiation, is necessary and is accomplished using a narrow band interference filter 21. If omnidirectionality is required, several filters can be used to surround the plasma source. Any dark areas which would be apparent near the source are irrelevant since the mode of propagation of the signal is by multiple scattering, consequently washing out details of the source construction. Such an embodiment is depicted in FIG. 4 wherein cover 22 contains the filter 21.

Other advantages of the instant invention are the low powers required to operate the source, e.g. from 0.1 to 100 W. This range makes the UVCOM system viable for solid state power sources carried into the field, aircraft, and certain ship mounted assemblies. The small size is another advantage especially for personnel carried units. The proven ruggedness and reliability of electrodeless lamps is another advantage of this invention.

Figure 6:
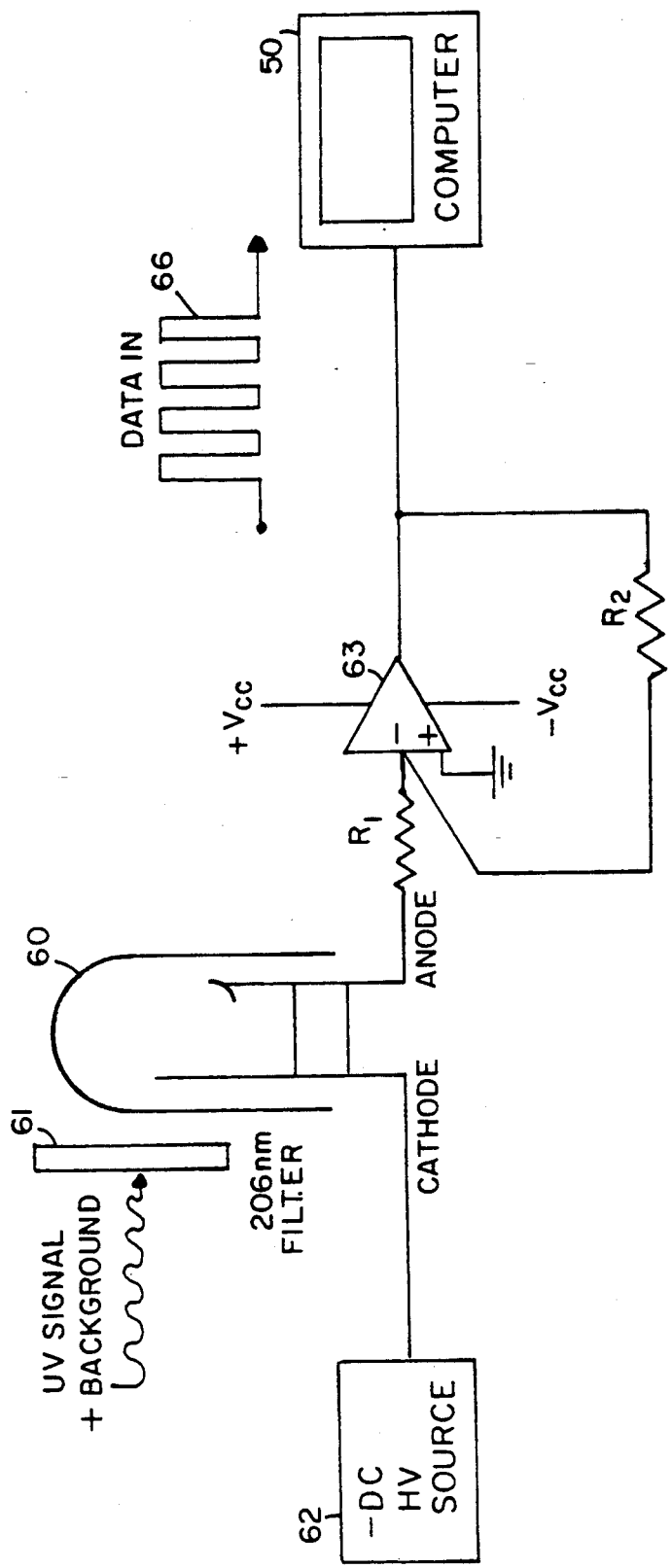
FIG. 6 shows a detection device useful for receiving UV pulses.

A receiver is needed to complete the UVCOM link. Many receivers exist to receive UV signals and one such embodiment to show in FIG. 6. The receiver has a solar blind photo multiplier transducer 60 which receives the UV pulses after being filtered by filter 61. A high voltage DC power source 62 supplies power to the photomultiplier transducer 60. The signal received is sent through an inverting high impedance FET amplifier 63 so that the inverting amplifier inverts the negative signal from the photomultiplier 60 into normal positive polarity TTL pulses 66. The TTL output voltage level of the inverter 63 is determined by the amplifier gain and is approximately equal to $R_2/R_1$. The pulses 66 are then read by computer 50 and the message is received.

Figure 7:
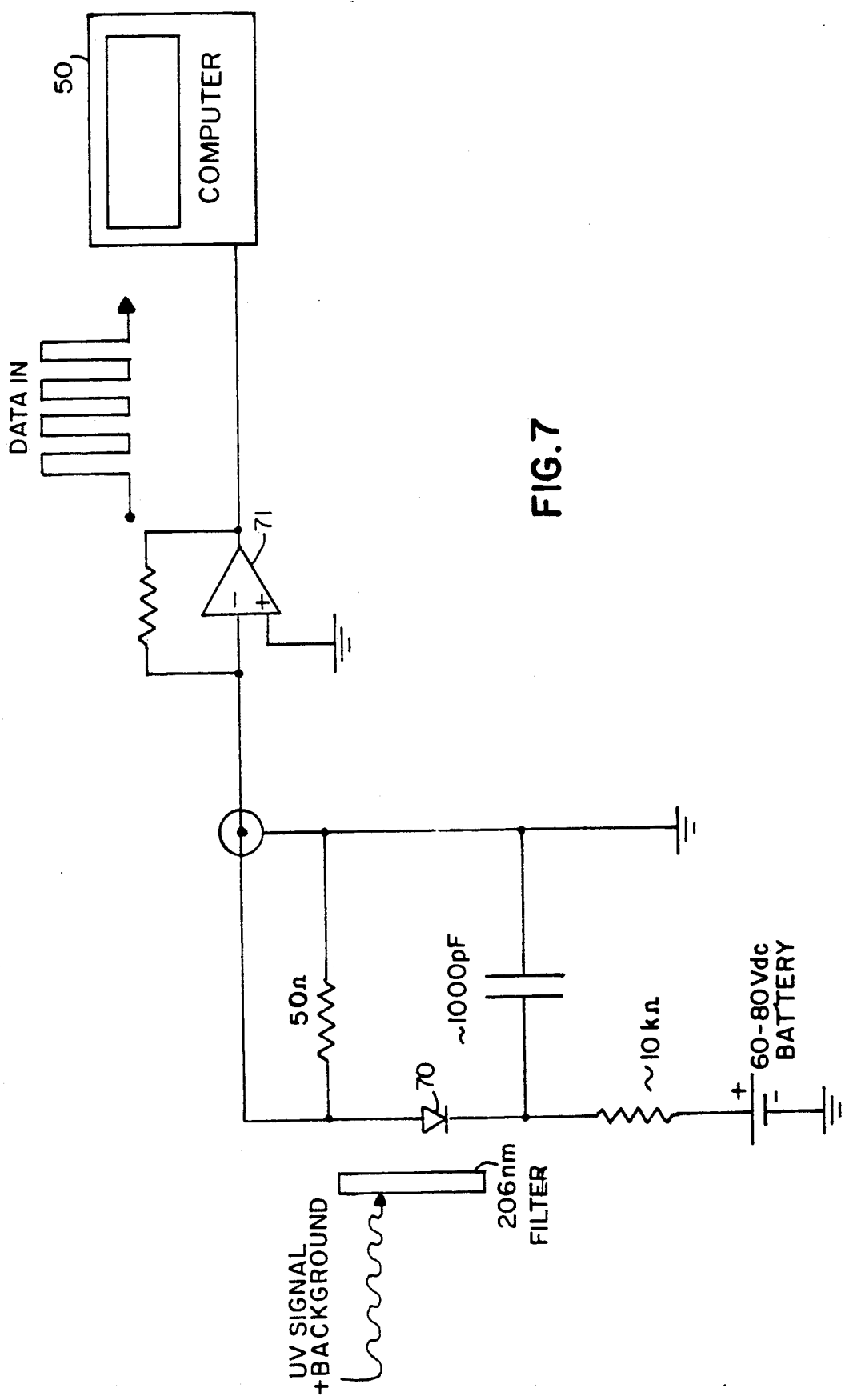
FIG. 7 shows an alternate detection device useful for receiving UV pulses.

An alternate detector circuit can be constructed wherein a UV sensitive photodiode with integral amplifier is used the detector preamplifier. An example of such a diode is HUV-1100 BQ available from EG&G PHOTON DEVICES located at 36 Congress Street, Salem, MA. A discreet photodiode with a separate op amp may be used and such a circuit is shown in FIG. 7. The photodiode 70 is a high speed detector and an example of such a component is S1722-02 available from the Hamanatsu. The diode 70 is used in reversed biased condition. An op amp 71 is used to amplify the signal. Several op amp may be required to obtain the proper gain of the signal which is interpreted by computer 50.

While there have been shown and described what are at present considered the preferred embodiment of the invention, it will be apparent to those skilled in the art that various changes, alterations and modifications may be made therein without departing from the scope of the invention as defined by the appended claims.

What is claimed is:

1. An ultraviolet communications transmitter operating in the solar blind wavelength region comprising:
   an ultraviolet transmissive envelope, said envelope having a outer surface and at least one reentrant cavity and enclosing a fill material containing iodine vapor which forms during discharge a plasma which emits ultraviolet radiation at a wavelength of about 206 nm and has an effective electrical impedance;
   an outer conductor positioned around an outer surface of said envelope;
   an inner conductor positioned in the reentrant cavity;
   a high frequency power source coupled to said inner and outer conductors for inducing an electric field in said envelope and causing discharge therein;
   a modulation circuit coupled to said high frequency power source which modulates the power output of said high frequency power source; and
   filtering means surrounding said transmissive envelope which filters out noise from a desired wavelength;
   said apparatus having a first capacitive impedance associated with coupling of said high frequency power from said inner conductor to said plasma and having a second capacitive impedance associated with coupling of high frequency power from said outer conductor to said plasma, said inner and outer conductors having sufficient surface area to produce first and second capacitive impedances, respectively, which are less than the impedance of said plasma.

2. The transmitter according to claim 1 wherein said modulation circuit modulates the power output of said high frequency power source in response to TTL pulses.

3. The transmitter according to claim 1 wherein said ultraviolet transmissive envelope is made of Suprasil ®.

4. The transmitter according to claim 1 wherein said ultraviolet transmissive envelope is made of quartz.

5. The transmitter according to claim 1 wherein the high frequency power source applied RF excitation at 915 MHz.

6. A method for transmitting data comprising:
   providing an ultraviolet transmissive envelope having at least one reentrant cavity and enclosing a fill material containing iodine vapor which forms during discharge a plasma which emit ultraviolet radiation at a wavelength of about 206;
   providing an outer conductor positioned around an outer surface of the transmissive envelope;
   providing an inner conductor position in the reentrant cavity;
   providing a filtering means positioned around the transmissive envelope which filters the desired wavelength from the plasma noise;
   applying a high frequency pulse between the inner and outer conductors causing an electric field therebetween which causes an electric discharge with consequent ultraviolet emission of the plasma;
   modulating the high frequency power source, said modulation corresponding to the data to be transmitted.

7. The method according to claim 6 further comprising:
   receiving the ultraviolet discharge emission.

8. An ultraviolet communications system operating in the solar blind wavelength region comprising:
   an ultraviolet transmissive envelope, said envelope having a outer surface and at least one reentrant cavity and enclosing a fill material containing iodine vapor which forms during discharge a plasma which emits ultraviolet radiation at a wavelength of about 206 nm and has an effective electrical impedance;
   an outer conductor positioned around an outer surface of said envelope;
   an inner conductor positioned around an outer surface of said envelope;
   a high frequency power source coupled to said inner and outer conductors for inducing an electric field in said envelope and causing discharge therein;
   a modulation circuit coupled to said high frequency power source which modulates the power output of said high frequency power source; and
   filtering means surrounding said transmissive envelope which filters out noise from a desired wavelength;
   said apparatus having a first capacitive impedance associated with coupling of said high frequency power from said inner conductor to said plasma and having a second capacitive impedance associated with coupling of high frequency power from said outer conductor to said plasma, said inner and outer conductors having sufficient surface area to produce first and second capacitive impedances, respectively, which are less than the impedance of said plasma;
   means to receive the ultraviolet discharge emission.

* * * * *